United States Patent

Gallagher

[15] 3,645,264
[45] Feb. 29, 1972

[54] ABSORBENT PAD

[72] Inventor: John P. Gallagher, 1519 North Ocean Way, Palm Beach, Fla. 33480

[22] Filed: Nov. 5, 1970

[21] Appl. No.: 87,042

[52] U.S. Cl. ............................................................128/296
[51] Int. Cl. .......................................................A61f 13/00
[58] Field of Search ..........................128/155–156, 283–284, 128/287, 296

[56] References Cited

UNITED STATES PATENTS 3,468,311  9/1969  Gallagher ..............................128/296
3,548,420  12/1970  Spence............................128/DIG. 21

OTHER PUBLICATIONS

" The Silicones as Tools in Biological Engineering," Med. Electron., Biol. Engng. Vol. 3, pp. 127– 136. 1965
The Bulletin, Dow Corning, Vol. 4, No. 4, Oct. 1962.

Primary Examiner—Charles F. Rosenbaum
Attorney—Stowell & Stowell

[57] ABSTRACT

An absorbent pad comprising a plurality of layers including at least a pneumatic cellular layer, a liquid absorbent layer and a bottom liquid impervious layer, the pneumatic cellular layer comprising a pair of plastic sheets having a plurality of air cells extending between opposed surfaces thereof, portions of the opposed surfaces of the sheets being sealed to each other to form partition walls between adjacent cells and liquid permeable perforations extending through the partition walls, is provided with a fluid or elastomeric coating of a nonirritating silicone composition on the upper surface of the cellular layer to enhance patient comfort and reduce sticking of the patient's body thereto.

3 Claims, 4 Drawing Figures

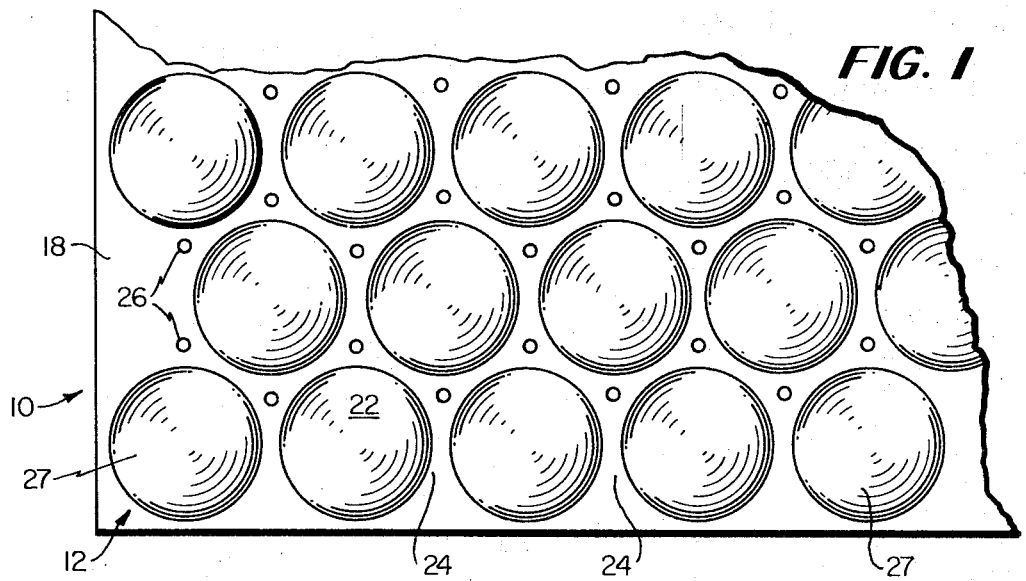
FIG. 1
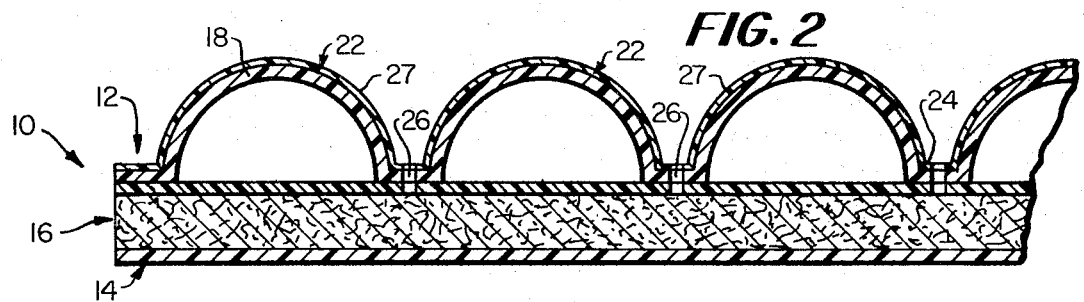
FIG. 2
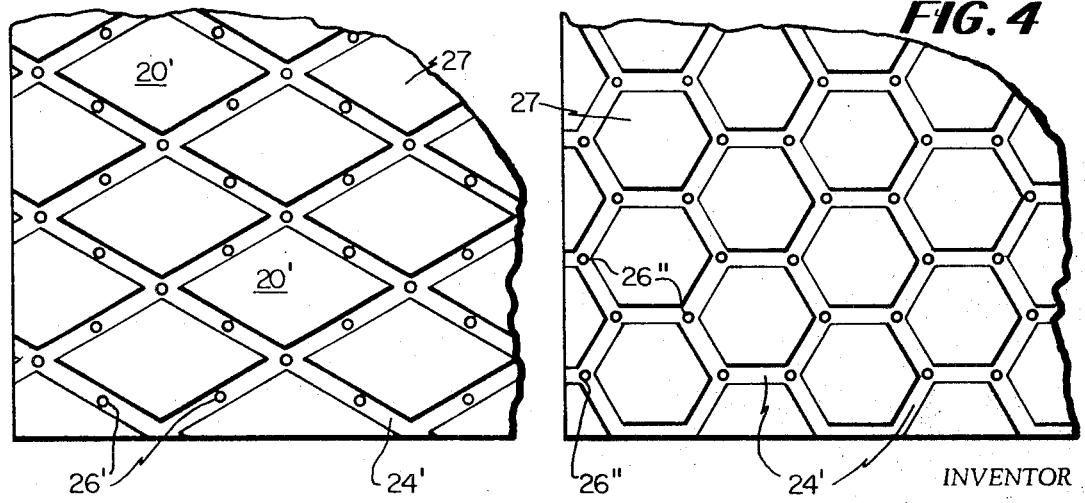
FIG. 3
FIG. 4
INVENTOR
JOHN P. GALLAGHER
BY Stowell & Stowell
ATTORNEYS

ABSORBENT PAD

In my U.S. Pat. No. 3,468,311 I have described an absorbent pad comprising a plurality of layers including at least a pneumatic cellular layer, a liquid absorbent layer and a bottom liquid impervious layer, the pneumatic cellular layer comprising a pair of plastic sheets extending between opposed surfaces thereof, portions of the opposed surfaces of the sheets being sealed to each other to form partition walls between adjacent cells and liquid permeable perforations extending through the partition walls.

I have now found that the comfort of the patient may be substantially enhanced and sticking of the patient's body to the pad greatly reduced by providing a fluid or elastomeric coating of a nonirritating silicone composition on the upper surface of the cellular layer.

The invention will be more particularly described in reference to the accompanying drawings wherein:

FIG. 1 is a top plan view of an absorbent pad constructed in accordance with the teachings of the present invention;

FIG. 2 is a sectional view of the structures illustrated in FIG. 1;

FIG. 3 is a top plan view of a modified form of the present invention; and,

FIG. 4 is a view like FIG. 1 of a further form of the present invention.

Referring to the drawings, the improved absorbent pad 10 comprises at least three layers. The uppermost layer generally designated 12 comprises a pneumatic cellular cushion layer; 14 represents a bottom layer comprising a liquid impervious plastic sheet or the like; and 16 generally designates a highly absorbent layer sandwiched between the cushion layer and the liquid impervious layer.

The topmost layer comprises a pair of plastic sheets 18 and 20 assembled to provide a plurality of air or other gaseous or fluid filled cells 22, which cells are spaced from each other by partition zones or walls 24 formed by sealing the opposed surfaces of the plastic sheets 18 and 20 together.

In general the cells 22 are uniformly spaced about the top layer 12 and provide the primary cushioning feature of the invention. Between the cells 22 and in the partition walls 24 are a plurality of perforations 26 which perforations are large enough to permit generally unrestricted flow of body fluids from the top surface 18 of the cushion layer 12 into the absorbent layer 16. Further, the number of the perforations 26 is such that uncontrolled bladder emptying of a human may readily pass through the perforations 26 to the absorbent layer 16 without flooding over the marginal side edges of the pad when the dimensions of the pad are approximately 24 by 36 inches.

The upper surface of the cells 22 are coated with a layer 27 of a nonirritating fluid or elastomeric silicone composition to prevent adhesion of the surface of the pad to the body of the patient and to facilitate movement of the patient on the pad. Typical of the silicone compositions which are suitable for the formation of layer 27 are polydimethylsiloxanes, such as Dow Corning 360 Medical Fluid and Dow Corning Medical Silastic 382 elastomer.

The absorbent layer 16 may comprise substantially any of the highly absorbent natural or synthetic fibers, woven, nonwoven or porous members. Very satisfactory results may have been provided by the use of mats or batts of synthetic fibers, mixtures of synthetic fibers, nonwoven cellulosic batts or open cell spongelike sheets. In a specific embodiment of the present invention the absorbent layer 16 comprises a batt of cotton linters or slivers which have been treated with a conventional wetting agent to assist in drawing body fluids from the exposed surface of the air cushion element 12 into the fibrous batts.

The absorbent layer may comprise a mat or mass of hydrophobic fibers wherein the liquid retaining function of the batt takes place along the large surface area of the fibers. Nonwater wetting fibers such as Dacron and nylon have the characteristic property of being nonwater absorbent from the standpoint that water generally down not penetrate the fibers, however, such fibers have the characteristic of permitting fluids to wick along their surface and in this manner a batt of such fibrous material will retain or hold a large quantity of liquid upon its large surface area when disposed in batt arrangement.

The lowermost layer of the composite pad preferably consists of a thin layer of water impervious plastic such as polyethylene, polypropylene and the like. The primary function of the layer 14 is to provide a barrier for body liquids contained in the liquid holding or storage zone 16.

In FIG. 1 the air cells 22 are generally spheroidal in transverse section; however, the shape of the cells is not critical and the cells 20' and 20" may be diamond shaped as shown in FIG. 3, or hexagonal as shown in FIG. 4. The actual shape of the air cells should be such that the body of a person may be retained by the air cells in generally spaced relation to the partition zones 24, 24', 24" which contain the perforations 26, 26', etc. By supporting the body of the patient spaced from the partition walls 24, 24' insures rapid drainage of body fluid into the absorbent battlike layer 16 and prevents wicking of fluids from the batt to the body of the patient.

The modified form of the absorbent pad described herein is of particular value in the treatment of badly burned patients.

I claim:

1. An absorbent pad comprising a plurality of layers including at least a pneumatic cellular layer, a liquid absorbent layer and a bottom liquid impervious layer, the pneumatic cellular layer comprising a pair of plastic sheets having a plurality of air cells extending between opposed surfaces thereof, portions of the opposed surfaces being sealed to each other to form partition walls between adjacent cells and liquid permeable perforations extending through the partition walls, and a fluid or elastomeric coating of a nonirritating silicone composition on the upper surface of the cellular layer.

2. An absorbent pad as claimed in claim 1 wherein the silicone composition is a liquid polydimethylsilicone.

3. An absorbent pad as claimed in claim 1 wherein the silicone composition is an elastomeric polydimethylsilicone.

* * * * *